(12) United States Patent
Cain, II

(10) Patent No.: US 11,240,634 B1
(45) Date of Patent: Feb. 1, 2022

(54) SYSTEMS AND METHODS FOR INITIATING A SECURE MEDIA SESSION BETWEEN MOBILE COMPUTING DEVICES DURING IMAGE CAPTURE

(71) Applicant: Leon Tyrone Cain, II, Cary, NC (US)

(72) Inventor: Leon Tyrone Cain, II, Cary, NC (US)

(*) Notice: Subject to any disclaimer, the term of this patent is extended or adjusted under 35 U.S.C. 154(b) by 0 days.

(21) Appl. No.: 16/732,674

(22) Filed: Jan. 2, 2020

(51) Int. Cl.
| | |
|---|---|
| *H04W 4/029* | (2018.01) |
| *H04W 4/021* | (2018.01) |
| *H04W 4/02* | (2018.01) |
| *H04L 29/08* | (2006.01) |
| *G06Q 20/32* | (2012.01) |

(52) U.S. Cl.
CPC ........ *H04W 4/029* (2018.02); *G06Q 20/3224* (2013.01); *H04L 67/18* (2013.01); *H04W 4/021* (2013.01); *H04W 4/023* (2013.01)

(58) Field of Classification Search
CPC ..... H04W 4/029; H04W 4/021; H04W 4/023; H04L 67/18; G06Q 20/3224
USPC ..................................................... 455/456.1
See application file for complete search history.

(56) References Cited

U.S. PATENT DOCUMENTS

| | | | |
|---|---|---|---|
| 9,779,246 B2* | 10/2017 | Giraud | G06F 21/575 |
| 2007/0237128 A1* | 10/2007 | Patel | H04L 45/00 |
| | | | 370/351 |
| 2012/0317202 A1* | 12/2012 | Lewis | H04L 63/302 |
| | | | 709/204 |
| 2013/0013912 A1* | 1/2013 | Rung | G06Q 20/123 |
| | | | 713/150 |
| 2014/0101781 A1* | 4/2014 | Bouknight | G06F 21/10 |
| | | | 726/28 |
| 2017/0330187 A1* | 11/2017 | Kohli | G06Q 20/409 |
| 2018/0075327 A1* | 3/2018 | Rubinton | G06F 16/29 |
| 2019/0313213 A1* | 10/2019 | Chokshi | G08B 21/0277 |

* cited by examiner

*Primary Examiner* — Inder P Mehra

(57) ABSTRACT

Systems and methods for executing a secured media transfer session between mobile computing devices during image capture. The system receives a request to initiate a secure media session, determines a first geospatial location of a first mobile computing device, determines a second geospatial location of a second mobile computing device, and determines whether the second mobile computing device is within a proximity of the first mobile computing device. In response to determining that the second mobile computing device is within the proximity of the first mobile computing device, the system initiates a secure media session between the first and second mobile computing device, captures the media content during the initiated secure media session, associates a secure ID with the captured media content and transmits the captured media content and associated secured ID to a first memory location at a third computing device.

20 Claims, 7 Drawing Sheets

SYSTEMS AND METHODS FOR INITIATING A SECURE MEDIA SESSION BETWEEN MOBILE COMPUTING DEVICES DURING IMAGE CAPTURE

TECHNICAL FIELD

The presently disclosed subject matter relates to initiating a secure media session between mobile computing devices. More particularly, the presently disclosed subject matter relates to systems and methods for initiating a secure media session between mobile computing devices during image capture.

BACKGROUND

Events and memorable moments can occur on scheduled or instantly at a moment's notice. As these events happen, we often grab a smartphone and record video and/or take pictures in order to capture the event. However, often times the individual taking the video or photos of the event misses out on the first-hand experience since they are focused on the filming aspect using their smartphone.

In order for someone to fully enjoy live events while capturing the moment on video or photograph, people typically hire personal photographers and videographers to take pictures and/or film events on their behalf in order to alleviate the distraction—allowing them to fully enjoy the event in real-time. However, these services are expensive and require personal scheduling sometimes days or even weeks in advance. Often times, smartphone users become desperate and personally ask a willing bystander to take a photo on their own behalf using their smartphone device. However, during certain events, it is highly unlikely and unpractical that there will be a willing participate within the vicinity around the time same time you want another person to use your smartphone to capture the moment. With advances in smartphone technology, peer-to-peer (P2P) networking, and video transfer protocols (VTP), users connect and collaborate between mobile communication devices. However, P2P networking and VTP pose security issues and expose users to unnecessary risk relating to data privacy and cybersecurity. While current mobile devices are able to connect, send and receive text messages, photos, and videos between devices with the aid of a third-party server, current mobile device network protocols do not allow mobile devices to connect in a secure network environment while transferring captured photos and videos between each device based on a mobile users proximity. As such, there is a need for a new mobile device system that can establish a secure connection between smartphone devices, allowing another user of the device to capture and transfer videos and photos in real-time between devices without data privacy breaches and unwanted infiltration.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Disclosed herein are systems and methods for establishing a secured media session between mobile computing devices during image capture and media transfer based on user proximity. According to an aspect, a method includes receiving, from a first mobile computing device associated with a user, a request to initiate a secure media session, determining, by a processor, a first geospatial location of the first mobile computing device, determining, by the processor, a second geospatial location of a second mobile computing device, determining, by the processor, whether the second mobile computing device is within a proximity of the first mobile computing device, in response to determining that the second mobile computing device is within the proximity of the first mobile computing device, transmitting, by the processor, a notification to initiate a secure media session between the first mobile computing device and the second mobile computing device, and initiating, by the processor, a secure media session between the first and second mobile computing device. The method further includes at the second mobile computing device, capturing, using an image capture device integrated within the second mobile computing device, media content during the initiated secure media session between the first and second mobile computing device, associating a secure ID with the captured media content, transmitting, by the processor, the captured media content and associated secured ID to a first memory location at a third computing device during the secured media session, and deactivating, by the processor, the secure media session between the first and second mobile computing device.

According to another aspect, a system includes a processor, and memory, wherein the processor is configured to receive, from a first mobile computing device associated with a user, a first request to initiate a secure media session, determine a first geospatial location of the first mobile computing device, determine a second geospatial location of a second mobile computing device, determine whether the second mobile computing device is within a proximity of the first mobile computing device based on comparing the first and second geospatial location of the first and second mobile computing devices, in response to determining that the second geospatial location of the second mobile computing device is within the proximity of the first mobile computing device, transmit a notification to initiate a secure media session with the first mobile computing device, initiate a secure media session between the first and second mobile computing devices, capture, at the second mobile computing device using an image capture device, media content during the secure media session between the first and second mobile computing devices, transmit the captured media content to a memory location of a third computing device during the secured media session, and deactivate the secure media session.

BRIEF DESCRIPTION OF THE DRAWINGS

The foregoing summary, as well as the following detailed description of various embodiments, is better understood when read in conjunction with the appended drawings. For the purposes of illustration, there is shown in the drawings exemplary embodiments; however, the presently disclosed subject matter is not limited to the specific methods and instrumentalities disclosed. In the drawings.

DETAILED DESCRIPTION

Figure 1:
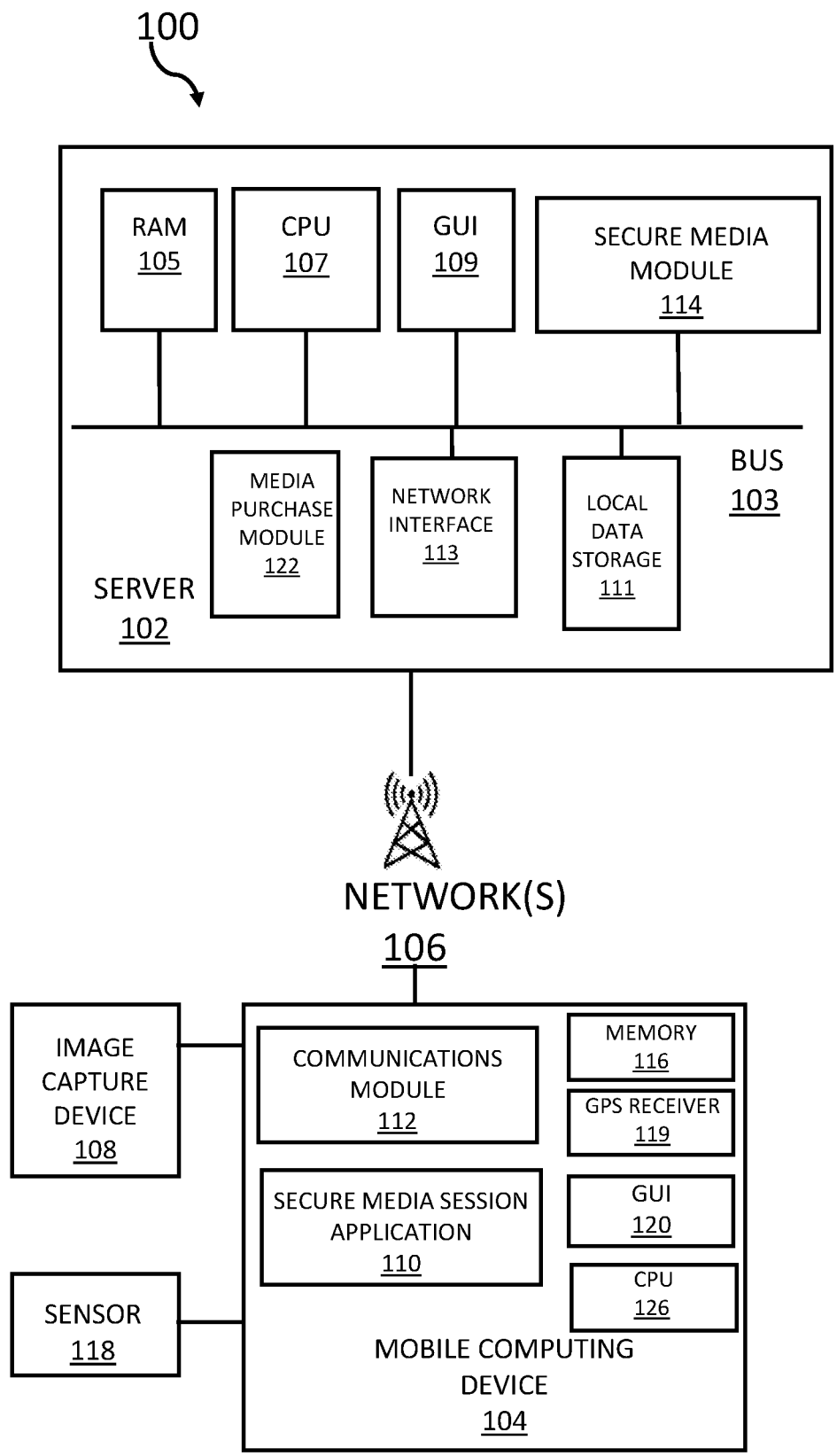
FIG. 1 is a block diagraph of an example system for establishing a secured media session between mobile computing devices during service and media transfer in accordance with embodiments of the present disclosure.

The presently disclosed subject matter is described with specificity to meet statutory requirements. However, the description itself is not intended to limit the scope of this patent. Rather, the inventors have contemplated that the claimed subject matter might also be embodied in other ways, to include different steps or elements similar to the ones described in this document, in conjunction with other present or future technologies.

The present disclosure provides systems and methods for establishing a secured media session between mobile computing devices during service and media transfer. As an example, a first mobile device, such as a first mobile computing device, may include a secure media session application that when activated, obtains the geospatial location information of the first mobile computing device and allows the user of the first mobile device to send a request to another mobile device, such as a second mobile computing device, within a designated proximity. The method further includes capturing the geospatial location information of the second mobile computing device. The notification may be a notification for service, such as a notification to establish a secured media session and execute a media session service activity, such as taking pictures or capturing video of media content. The notification may contain a user profile of a user of the first and/or second mobile computing device and device information of the first and/or second mobile computing device. Once the second mobile computing device receives and accepts the notification, a secured media session is initiated between the first and second mobile computing devices. During the secured media session, software components associated with the second mobile computing device are disabled. The second mobile computing device captures a plurality of media content using the integrated video camera of the second mobile computing device during the secured media session. Once the secured media session is deactivated, a release ID is associated with the captured media content and transmitted to the first mobile computing device via a third computing device, such as a server. Further, the second mobile computing device transmits the captured media content to the third computing device. Prior to transmitting the captured media content, an encrypted secure ID is also associated with the captured media content and transmitted to the third party computing device. The first mobile computing device may access, via the secure media session application, the media content using the release ID. The third computing device verifies that the secured ID associated with the captured media content and the release ID associated match. Upon determining that the secured ID and release ID match, the first mobile computing device may access the stored media content.

As referred to herein, the term "mobile computing device" or "computing device" should be broadly construed. It can include any type of device including hardware, software, firmware, the like, and combinations thereof. A computing device may include one or more processors and memory or other suitable non-transitory, computer readable storage medium having computer readable program code for implementing methods in accordance with embodiments of the present disclosure. A computing device may be, for example, a server or a cloud computing server or cloud computing device. In another example, a computing device may be any type of conventional computer, such as a laptop computer or a tablet computer or a desktop computer. In another example, the computing device may be a battery powered Internet of Things (IoT) device. In another example, a computing device may be a mobile computing device such as, for example, but not limited to, a smartphone, a smartphone with an integrated video camera, a cell phone, a pager, a personal digital assistant (PDA), a mobile computer with a smart phone client, or the like. In another example, a computing device may be a single-board computer, such as a computer in the Raspberry Pi series of computers developed by the Raspberry Pi Foundation. A typical mobile device is a wireless data access-enabled device (e.g., an IPHONE® smartphone, a BLACKBERRY® smart phone, a NEXUS ONE® smart phone, an IPAD® device, or the like) that is capable of sending and receiving data in a wireless manner using protocols like the Internet Protocol, or IP, FTP (files transfer protocols), SFTP (secure file transfer protocol), and the wireless application protocol, or WAP. This allows users to access and transfer files, media, and other information via wireless devices, such as smart phones, mobile phones, pagers, two-way radios, communicators, and the like. Wireless data access is supported by many wireless networks, Wi-Fi, including, but not limited to, CDPD, CDMA, GSM, PDC, PHS, TDMA, FLEX, ReFLEX, iDEN, TETRA, DECT, DataTAC, Mobitex, EDGE and other 2G, 3G, 4G and LTE technologies, and it operates with many handheld device operating systems, such as PalmOS, EPOC, Windows CE, FLEXOS, OS/9, JavaOS, iOS and Android. Typically, these devices use graphical displays and can access the Internet (or other communications network) on so-called mini- or microbrowsers, which are web browsers with small file sizes that can accommodate the reduced memory constraints of wireless networks. In a representative embodiment, the mobile device is a cellular telephone or smart phone that operates over GPRS (General Packet Radio Services), which is a data technology for GSM networks. In addition to a conventional voice communication, a given mobile device can communicate with another such device via many different types of message transfer techniques, including SMS (short message service), enhanced SMS (EMS), multi-media message (MMS), email WAP, paging, or other known or later-developed wireless data formats. Although many of the examples provided herein are implemented on a mobile device, the examples may similarly be implemented on any suitable computing device.

As referred to herein, a "user interface" is generally a system by which users interact with a computing device. A user interface can include an input for allowing users to manipulate a computing device, and can include an output for allowing the system to present information and/or data, indicate the effects of the user's manipulation, etc. An example of a user interface on a computing device (e.g., a mobile device) includes a graphical user interface (GUI) that allows users to interact with programs in more ways than typing. A GUI typically can offer display objects, and visual indicators, as opposed to text-based interfaces, typed command labels or text navigation to represent information and actions available to a user. For example, a user interface can be a display window or display object, which is selectable by a user of a mobile device for interaction. The display object can be displayed on a display screen of a mobile device and can be selected by, and interacted with by, a user using the user interface. In an example, the display of the mobile device can be a touch screen, which can display the display icon. The user can depress the area of the display screen at which the display icon is displayed for selecting the display icon. In another example, the user can use any other suitable user interface of a mobile device, such as a keypad, to select the display icon or display object. For example, the user can use a track ball or arrow keys for moving a cursor to highlight and select the display object.

As used herein, the term "memory" is generally a storage device of a computing device. Examples include, but are not limited to, ROM and RAM.

Operating environments in which embodiments of the presently disclosed subject matter may be implemented are also well-known. In a representative embodiment, a computing device, such as a mobile device, is connectable (for example, via WAP) to a transmission functionality that varies depending on implementation. Thus, for example, where the operating environment is a wide area wireless network (e.g., a 2.5G network, a 3G network, or the proposed 4G network), the transmission functionality comprises one or more components such as a mobile switching center (MSC) (an enhanced ISDN switch that is responsible for call handling of mobile subscribers), a visitor location register (VLR) (an intelligent database that stores on a temporary basis data required to handle calls set up or received by mobile devices registered with the VLR), a home location register (HLR) (an intelligent database responsible for management of each subscriber's records), one or more base stations (which provide radio coverage with a cell), a base station controller (BSC) (a switch that acts as a local concentrator of traffic and provides local switching to effect handover between base stations), and a packet control unit (PCU) (a device that separates data traffic coming from a mobile device). The HLR also controls certain services associated with incoming calls. Of course, the presently disclosed subject matter may be implemented in other and next-generation mobile networks and devices as well. The mobile device is the physical equipment used by the end user, typically a subscriber to the wireless network. Typically, a mobile device is a 2.5G-compliant device or 3G-compliant device (or the proposed 4G-compliant device) that includes a subscriber identity module (SIM), which is a smart card that carries subscriber-specific information, mobile equipment (e.g., radio and associated signal processing devices), a user interface (or a man-machine interface (MMI)), and one or more interfaces to external devices (e.g., computers, PDAs, and the like). The mobile device may also include a memory or data store.

The presently disclosed subject matter is now described in more detail. FIG. 1 is a block diagraph of an example system for systems and methods in accordance with embodiments of the present disclosure. Referring to FIG. 1, the system 100 includes a computing device 102 configured to execute functionality for establishing a secured media session between mobile computing devices during service and media transfer based on user proximity. The computing device 102, shown as a server 102, may be any suitable computing device such as a server, smartphone, tablet computer, network server, smartphone, device terminal, point-of-sale terminal, laptop computer, global position system, desktop computer or any other mobile, or stationary, computing device operable to receive communications, media content, and geospatial information from another computing device, such as mobile computing device 104. For example, the server 102 may receive from another computing device, such as mobile computing device 104, media content, such as photos, videos, graphics, emails, text messages, any one of a picture, video, movie, emoji, augmented reality image, music, and digital image or any other suitable media content and communication that may be presented via a user interface 109, 120 and/or stored in local data storage 111. For example, the server 102 may present to a user of the computing device 102 the images of received photographs or videos.

The server 102 includes a secured media module 114. The secure media module 114 may include suitable hardware, software, firmware, or combinations thereof for implementing the functionality described herein. The server 102 may also include one or more processor(s) 107 and memory (RAM/ROM) 105 connected via bus 103, for storing instruction for implementation on the processor 107, and a media purchase module 122. The one or more processors 107 may further include a central processing unit (CPU), a graphics processing unit (GPU) or both, a main memory and a static memory which communicate with each other via an interconnect 103 (e.g., a link, a bus, etc.). The secure media module 114 is configured to establish a secured media between the two or more mobile computing device(s) 104. Although one mobile computing device 104 is shown, any number of mobile computing devices may be configured within system 100. Server 102 may include one or more communications modules 112 configured to receive communications from another computing device such as a mobile computing device 104 via a network 106, such as the Internet and/or a mobile communications network (e.g., Wi-Fi or a cellular network). Wireless connection via the communication module 112 and network interface 113 may be enabled via any communication standard or protocol, such as IEEE 802.11, 3GPP LTE, Bluetooth, mesh networks, beacons, or any other such communication method.

The secure media module 114 may also be configured to establish a secured media session between one or more mobile computing devices 104 connected in network 106. Network may include a local area network, a wide area network, or the Internet, and may comprise any number of computing devices. In certain embodiments, the server 102, which may also cloud server computer 102, may manage system accounts and identifiers used for location based communications. Cloud server 102 may also provide geospatial map information and network based location assistance that may be used as part of location based communications in accordance with the present disclosure. Prior to establishing a secured media session, the secure media module 114 receives geospatial information from the mobile computing device 104 via the GPS receiver 119. The mobile computing device 104 may include an image capture device 108, sensor 118 (such as a Global Positioning Sensor (GPS) sensor, compass, location sensor, accelerometer, or other sensor), a communications module 112, one or more processor(s) 126, memory 116 (ROM and/or RAM), GPS receiver 119 which captures geospatial location information of the mobile computing device (disclosed below), and a secure media session application 110. The media purchase module 122 may be configured to accept, conduct, and support purchase transactions from any computing device (including a first and second mobile computing device), point-of-sale terminals, a cloud-based networking device or the like upon suitable authentication via a secure ID and release ID (to be explained in further detail below). The secure ID may also be referred to as a secure media session ID. Although only one server 102 and one computing device are shown, it should be understood that the system 100 may include any suitable number of servers and computing devices. The media purchase module 122 may release captured media content stored in memory awaiting download according to the embodiments disclosed in the present application, such as photographs, video, or audio, to the user of another computing device upon proper encryption identification.

The image capture device 108 may be integrated within the mobile computing device. The image capture device 108 may further be used to capture photographs and videos during the secure media session activated via the secure media session application 110 and established by the secure media module 114. Although not shown, the server 102 and mobile computing device 104 may include a video display unit, an alphanumeric input device (e.g., a keyboard), a user interface 109, 120 (GUI) and a navigation device (e.g., a mouse). In one embodiment, the video display unit, input device and GUI navigation device may be a touch screen display. Server 102 and mobile computing device 104 can additionally include a storage device (e.g., a drive unit), a signal generation device (e.g., a speaker), an output controller, a power management controller, and a network interface device 113 (which can include or operably communicate with one or more antennas, transceivers, or other wireless communications hardware).

Figure 2:
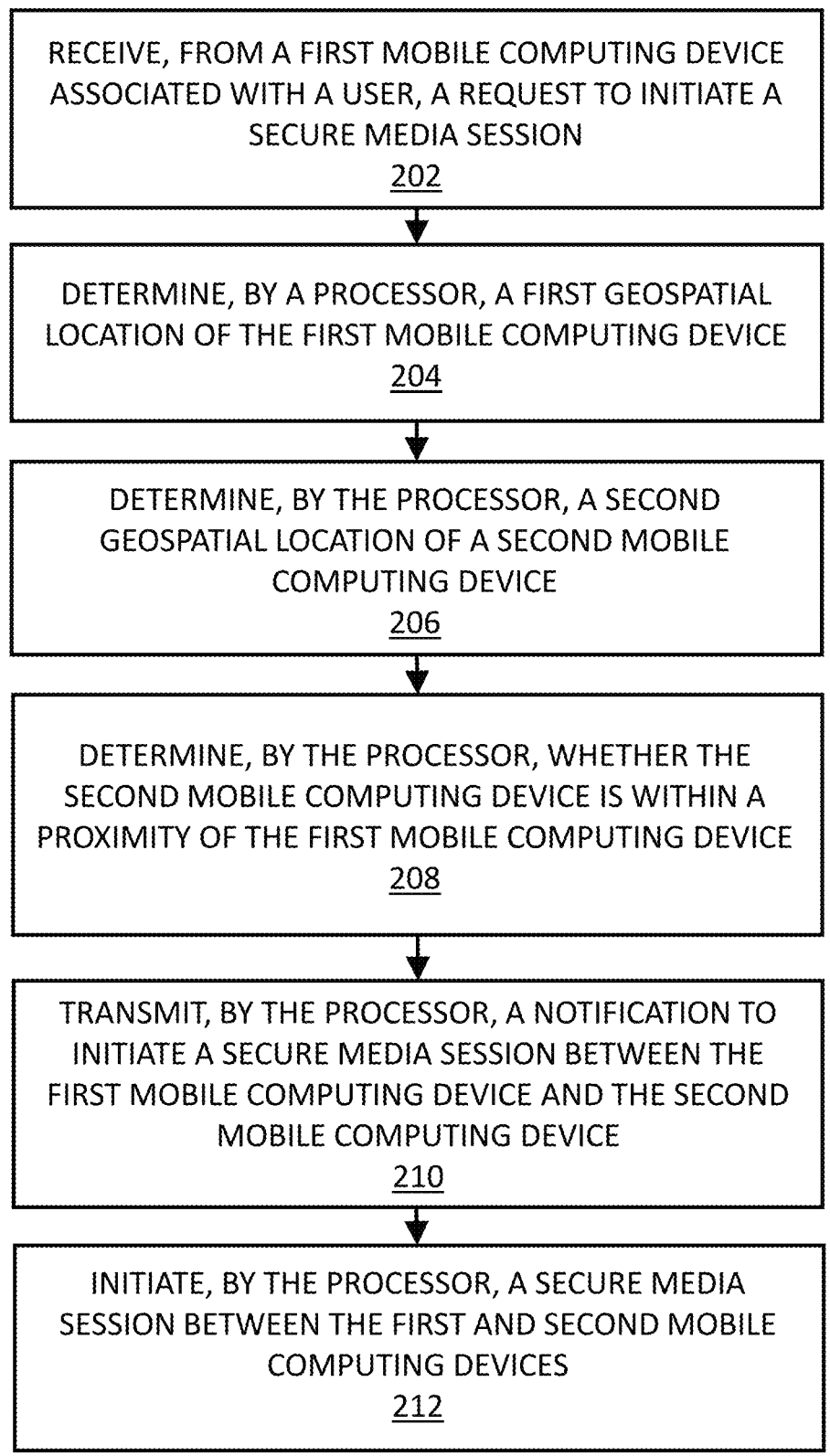
FIG. 2 is a flow chart of an example method for establishing a secured media session between mobile computing devices during service and media transfer in accordance with embodiments of the present disclosure.

FIG. 2 illustrates a flow chart of an example method for systems and methods for establishing a secured media session between mobile computing devices during service and media transfer based on user proximity in accordance with embodiments of the present disclosure. In this example, the method is described as being implemented by the system 100, server 102, and mobile computing device 104 shown in FIG. 1, but it should be understood that the method may alternatively be implemented by any suitable computing device. The method disclosed may be implemented via the secure media session module 114 and the secure media session application 110.

Referring to FIG. 2, the method includes receiving, from a first mobile computing device associated with a user, a request to initiate a secure media session 202. While certain operations of the method are described as being performed by certain devices, in different examples, different devices or a combination of devices may perform these operations. For example, operations described below as being performed by first mobile computing device, second mobile computing device, a server device, or client device may also be performed by or in combination with server-side computing device, or third-party server computing device. In some examples, the request may also be referred to as an initiating request and may also include a user profile of a user of the first and/or second mobile computing device and device information of the first and/or second mobile computing device. The device information may include any one of memory capacity, carrier information, model number, serial number, Wi-Fi address, Bluetooth capability, IMEI, ICCID, Firmware type, and device type information associated with the first and/or second mobile computing device. The method of FIG. 2 is described by example as being implemented by the system 100 and computing devices 102 and 104, as shown in FIG. 1, although it should be understood that the method may be implemented by any suitable computing device(s). Additionally, the reference is also made to the flow chart in FIG. 3, which is described in further detail herein in accordance with embodiments of the present disclosure. The computing device 102, which is shown as server 102, may receive the request to initiate the secure media session 202. The server 102 may be a standalone server device or can be connected, via a network or cloud-based network, to other terminal computing machines. In a network or cloud-based network configuration, the machine can operate in the capacity of either a server or a client machine in server-client network environment(s). The server 102 may also be configured in a peer-to-peer distributed network environment(s). The server 102 may also be a personal computer (PC) that may or may not be portable, such as a laptop or notebook computer, a tablet, a set-top box (STB), a gaming console, a Personal Digital Assistant (PDA), a mobile telephone or smartphone with an integrated or embedded camera, a web appliance, a network router, switch or bridge, or any computing device capable of executing instructions that specify actions or tasks to be executed by that computing device. Further, while only a single server is illustrated, the term "server" shall also be taken to include any collection of servers that individually or jointly execute a set (or multiple sets) of instructions to perform any one or more of the methods discussed in the present disclosure.

The user associated with the device as disclosed at step 202 may be any user competent to operate the mobile computing device 104. The user may one who intends to perform the actions being requested, such as, setting up a secured media session and capturing pictures, video, or other content utilizing the user's computing device 104 (e.g. smartphone with an integrated or embedded camera). The user may activate the secure media session application 110 at the mobile computing device 104 in order to transmit the request to initiate the secure media session. The server 102 includes a secure media session module, which further includes program code written to receive the request. The secure media session application 110 may include program code stored in memory and executed by the processor to communicate with the server 102 (e.g. secure media module 114) via network interface 113 (not shown at the mobile computing device 104), the request to initiate a secure media session 202, which may be transmitted and displayed via a notification on the user interface 120 of the mobile computing 104 to the server 102. The request may also include phrases or terminology legible to mobile device users within the proximity of the mobile computing device 104 asking to perform a type of service, such as, taking pictures or video utilizing a third computing device or a servicing device. The mobile computer device 104 may also be referred to as a requesting device 104. Once the server 102 receives the request to initiate the secure media session 202, the method determines, by a processor, a first geospatial location of the first mobile computer device 204 that transmitted the request to the server 102 via the secure media session application 110. The GPS receiver 119, may also include a GPS chip or module which provides precise location information using, for instance, geolocation information, a global positioning satellite (GPS) information, mobile computing triangulation, or any other relevant locating technology. The GPS receiver 119 may also provide calculate X, Y, Z coordinate information direction.

The geospatial location information of the first mobile computing device 204 may be first or second geospatial location information comprising any one of geo-spatial coordinates, map coordinates, longitude, latitude, speed, time, global positioning system coordinates, waypoints, points-of-interest, and regions-of-interest, geolocation information, geographic location information, GPS coordinates, waypoints, address information, latitude information, longitude information, speed, time, points-of-interest, regions-of-interests, map coordinates, geospatial coordinates, or any other information directed to the location of the mobile computing device. The secure media module receives the geospatial location information from GPS receiver 119 of the mobile computing device 104 and determines the location of the mobile device 104. The mobile device 104, also known as the requesting device 104, transmits its geospatial location information as determined by the server 102. The geospatial location information may also be referred to as at least one or more geospatial location information metrics. Still referring to the FIG. 2, the method further includes determining, by the processor, a second geospatial location of a second mobile computing device 206. The second mobile computing device may be a mobile computing device, such as a smartphone with an integrated camera configured to be operated by a user, within a predetermined proximity or vicinity of the first mobile computing device 104. As mentioned above, the geospatial location information may be geolocation information, geographic location information including GPS coordinates, waypoints, address information, latitude information, longitude information, speed, time, points-of-interest, regions-of-interests, map coordinates, geospatial coordinates, or any other information directed to the location of the second mobile computing device.

The method further determines, by the processor, whether the second mobile computing device is within a proximity of the first mobile computing device 208. The determination 208 may be implemented by the secure media session module 114 as shown in FIG. 1. The proximity of the first and second mobile computing devices as disclosed in step 208 may be known as a proximity range, a proximity area, or a geospatial area and may be designated at a predetermined distance range of 0-10 feet, 10-20 feet, 20-50 feet, 50-150 feet, 150-500 feet, 500-1500 feet, and 1500-3000 feet, 1 foot to 5 miles, or any reasonable distance or proximity measurement. The proximity may also be a geofence proximity in which the geofence is based on a distance proximity radius surround the first mobile computing device, e.g. requesting device 104. In an alternate embodiment, the second mobile computing device (described in detail later), which may be referred to the servicing device, distance is determined based on how far or close the second mobile computing device is from the first mobile computing device 104. The secure media session module of server 102 calculates whether the second mobile computing device is within the proximity range of the first mobile computing device by comparing each associated geospatial location information metric captured and received from the first and second mobile computing devices. The proximity range may be set automatically by the server 102 based on user preferences established by the user during initial application configuration or may be changed manually by the user during operation of the secure media session application or secure media session module. The proximity radius, also known as the geospatial area or proximity range, may be set in any distance value, including but not limited to, inches, feet, meters, miles, or the like.

For instance, the requesting device 104 may activate the secure media session application and configure the proximity range to 0-500 feet. The secure media session application transmits the configuration settings to server 102 via the network 106. The secure media module 114 receives the configuration and captures the geospatial location information of all mobile computing devices, including the second mobile computing device, within the proximity of 0-500 feet. If the location information metric of the second mobile computing device is within the predetermined proximity of the first mobile computing device the secure media session module executes step 210 as disclosed in FIG. 2 of the present disclosure. As disclosed in FIG. 2, when the second mobile computing device is within the proximity range of the first mobile computing device, the method includes transmitting, by the processor, a notification to initiate a secure media session between the first mobile computing device and the second mobile computing device 210. The notification may be any words, phrases, numbers, or alphanumeric characters, transmitted from the server 102 to the second mobile computing device, requesting to establish a secured session. The notification may also be referred to as a notification request. The user of the second mobile computing device may view the notification via the user interface 120. The notification may provide an option before the user of the second mobile computing device whether to accept or decline the notification request to establish the secure media session. The first mobile computing device may also receive a notification that the second mobile computing device has received the initiating request from the server 102.

Upon agreeing to initiate a secure media session by the second mobile computing device, the method includes initiating, by the processor, a secure media session between the first and second mobile computing devices 212. The secure media session may be executed through secure encryption networking protocols, FTP, SFTP, or any other known secured networking techniques. The first and second mobile computing devices may include circuitry, and program code designated in the secure media module, that initiates the secure media session between the first and second mobile computing devices 212. The circuitry (not shown) may be configured to generate cryptographic keys, which may be referred to as a secure ID and release ID, that may be used by the server 102 to initiate a secure media session via an encryption protocol designed to secure network communication using encryption in which two or more computing devices communicate over the network and verify generated private and public keys using encryption algorithms. Upon establishing the secure media session between the first and second mobile computing device, all active applications, hardware components, and other associated computing features are temporally disabled at the second mobile computing device while the first and second mobile computing devices are in an active secure media session (explained in further detail below) established by the server 102. In an alternate embodiment, the initiated secure media session may also include a secure network communication link between the first and second mobile computing devices enabling data transfer between the first and second mobile computing devices in real-time. In an alternate embodiment, the second mobile computing device may schedule and establish a geospatial location manually prior to initiating the secure media session. For instance, a requesting device may send a request to establish a secure media session (capture media content) using a message or notification display board, text message, or email via the secure media session application. Servicing device(s) may accept the request sent via the secure media session application, meet at the predetermined geospatial location and initiate the secure media session. In an alternate embodiment of the present disclosure, the servicing device may also be determined, located, and/or initiated in a secure media session with the first mobile computing device based on neural networks, deep learning, machine learning, artificial intelligence (AI), or data mining algorithms.

Figure 3:
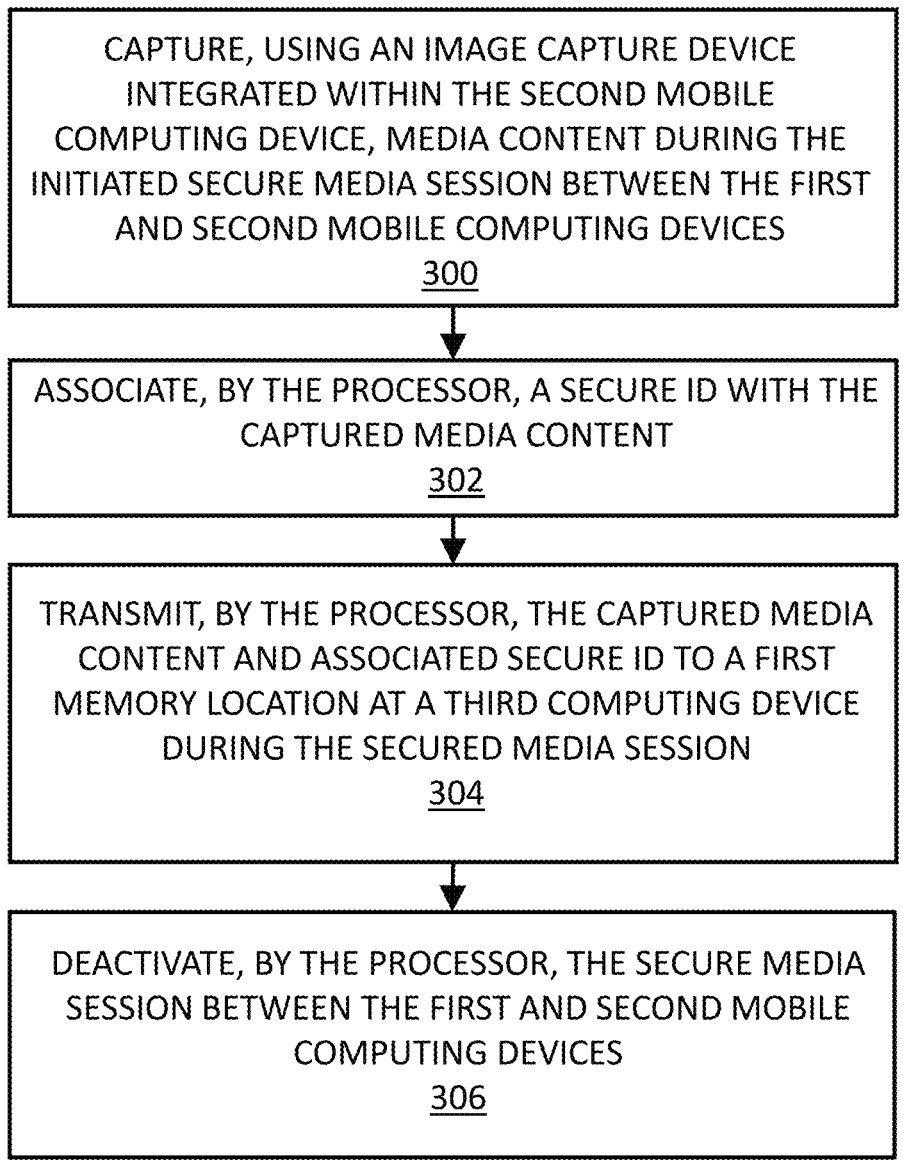
FIG. 3 is a flow chart of an example method for associating and transmitting the captured media content during the secured media session in accordance with embodiments of the present disclosure.

FIG. 3 is a flow chart of an example method for associating and transmitting the captured media content during the secured media session 300 in accordance with embodiments of the present disclosure. As shown in FIG. 3, once the secured media session as been initiated between the first and second mobile computing devices, the second mobile computing device, also known as the servicing device, includes capturing, using an image capture device integrated within the second mobile computing device, media content during the initiated secure media session between the first and second mobile computing devices 300. The image capture device may be a built-in digital camera configured and designed to capture photographs and record video and transmitting the captured photographs and video over a network. The lens may be a fixed-focus lens, a dual lens, triple lens configuration, or any configuration of lens known in the art and include a plurality of sensors, shutter, photoflash, BLUETOOTH®, geotag photo capability, and image stitching. The image capture devices may also include 4K resolution, high-definition resolution, HDR, optical zoom, optical image stabilization, three-dimensional imaging capability, bright lens, night mode, touchscreen execution, and bokeh-mode. The image capture device may be built into the first and/or second mobile computing device or the image capture device may be a separate image capture device connected to the first or second mobile computing devices through wired or wireless connectivity (e.g. BLUETOOTH® or USB or micro USB). The media content may be any activity, person, place, thing, event, environment, that may be captured using a camera or some other image capture device through photograph and/or video. In an alternate embodiment, the media content may also be audio related such as, voice, sounds, songs, concerts, or any other type of sound cable of being captured using audio equipment recording hardware (e.g. stand-alone or integrated microphones). As stated in step 300, the media content may be captured during the initiated secure media session between the first and second mobile computing devices 300. By capturing the media content during the initiated secured media session, processing speed at the second mobile computing device is improved due to the server 102 being configured to receive the media content captured from the second mobile computing device.

The media content may not be stored locally on the device, thus reducing memory usage and increasing overall processing speed at both the first and second mobile computing devices. During the initiated secure media session, the method further includes associating, by the processor, a secure ID with the captured media content 302. The secured media module 114 may be configured to generate cryptographic keys, one such cryptographic key being a secure ID. The secure ID may be generated by the server 102 and transmitted to the second mobile computing device. The second mobile computing device or in the alternate, the third computing device may compile and/or generate a digital image file containing the entire set of captured media content and associate the transmitted secure ID with the generated digital image file. The digital image file containing the captured media content may be in any format, such as TIFF, JPEG, GIF, PNG, or RAW image files. The secure ID associated with the digital image file containing the captured media content may be encrypted using encryption algorithms and transmitted via an encryption file transfer protocols, such as SSL (Secure Sockets Layer), FTP (File Transfer Protocol), FTPS (File Transfer Protocol Secure), SFTP (SSH File Transfer Protocol), HTTPS (Hyper-Text Transfer Protocol Secure), that are designed to secure network communication between two or more computing devices as they transmit and/or communicate over the network. The digital image file may only be unlocked after verification of a generated private and/or public keys using encryption algorithms. The generated private and/or public key may be known as a release ID (explained in greater detail below).

As further shown in step 304, the method includes transmitting, by the processor, the captured content and associated secure ID to a first memory location at a third computing device during the secured media session 304. The third memory device may be server 102 while the first memory location may be a field in a database, such as SQL or NoSQL as shown at local data storage 111 in FIG. 1. In order to minimize CPU usage at the server 102 processor 107, the system may store the digital image file and associated secure ID as plain files or within a file system within local data storage 111. An index of each digital image file may be generated by server 102 and stored in local data storage 111. The digital image files may be transmitted in real-time during the secure media session or once the secure media session has been terminated. The digital image files containing the associated secure ID may be transmitted during the secure media session in order to ensure privacy, increased network security, and to protect the identity of the captured media content. Upon the captured media content being transferred to the third computing device, the method includes deactivating, by the processor, the secure media session between the first and second mobile computing devices 306. The secure media session may be deactivated automatically as designated by the user during application configuration of the secure media session application or it may be deactivating manually at the first mobile computing device and/or at the second mobile computing device. The third computing device may also deactivate the secure media session in the event of a network security breach, corrupted media content, corrupted digital image files, manually by the user of the third computing device, or automatically by the user of the third computing device. The third computing device may also be server 102 or any other computing device configured with the secure media module 114.

Figure 4:
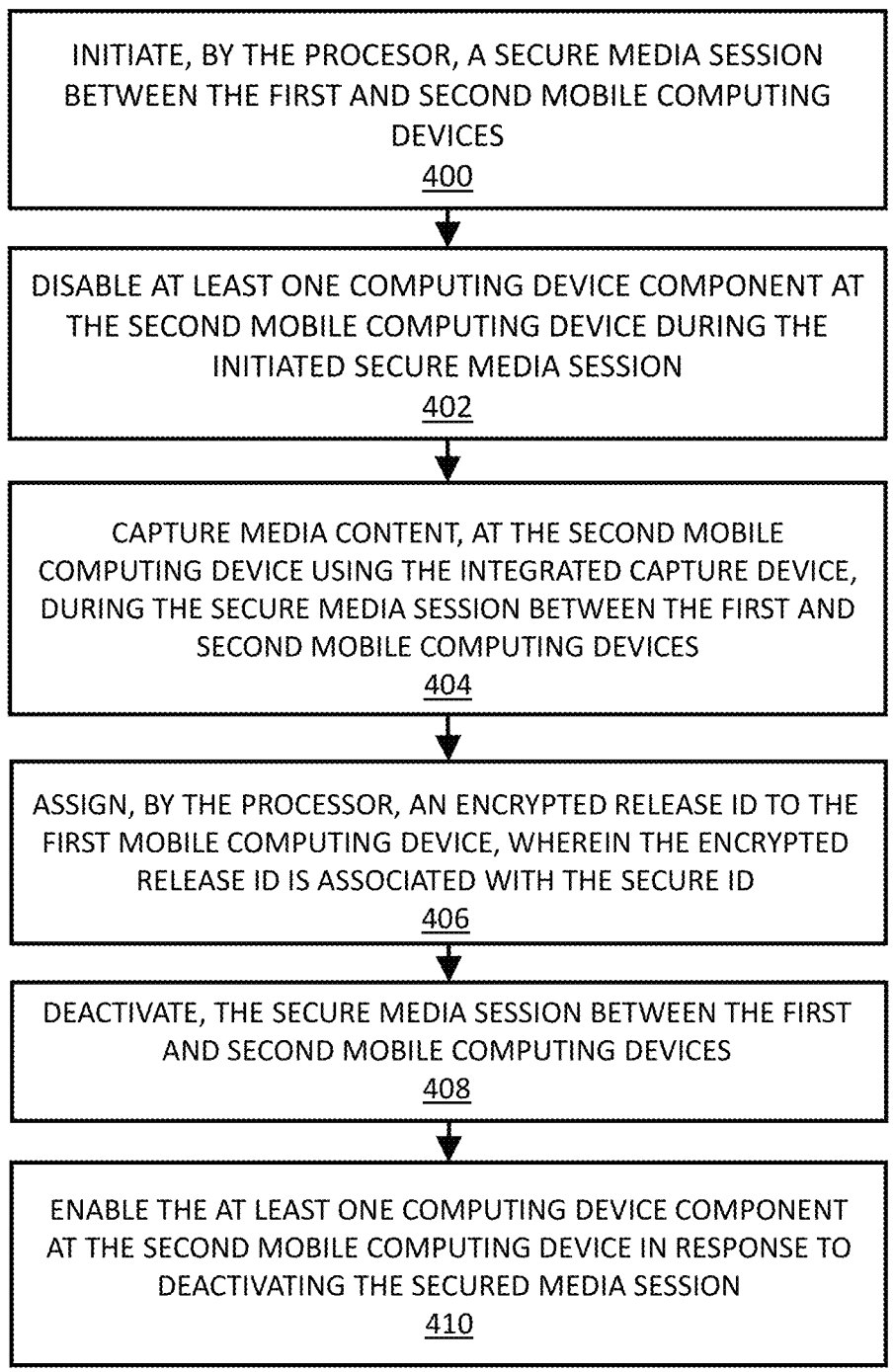
FIG. 4 is a flow chart of an example method for disabling and enabling the second mobile computing device during the secured media session in accordance with embodiments of the present disclosure.

FIG. 4 is a flow chart of an example method for disabling and enabling the second mobile computing device during the secured media session in accordance with embodiments of the present disclosure. In an alternate embodiment, the method includes initiating, by the processor, a secure media session between the first and second mobile computing devices 400. As mentioned above, the secure media session may be executed through secure encryption networking protocols, FTP, SFTP, or any other known secured networking techniques. The first and second mobile computing devices may include circuitry, and program code designated in the secure media module, that initiates the secure media session between the first and second mobile computing devices 212. Upon establishing the secure media session between the first and second mobile computing device, all active applications, hardware components, and other associated computing features are temporally disabled at the second mobile computing device while the first and second mobile computing devices are in an active secure media session established by the server 102. For instance, the method may include disabling at least one computing device component at the second mobile computing device during the initiated secure media session 402. In an alternate embodiment, the method may include disabling at least one software application and at least one hardware component integrated at the first and/or second mobile computing devices when the secure session has been initiated. The computing device components that may be disabled during the secure media session include may include software applications stored at the first mobile computing device and/or the second mobile computing device, hardware components integrated into the first mobile computing device and/or the second mobile computing device. The software applications that may be disabled at the first mobile computing and/or second mobile computing device may locally saving or storing photos, images, music, and other media related content, locally stored mobile device social media applications (TWITTER®, INSTAGRAM®, SNAPCHAT®, FACEBOOK®, TIKTOC®, LINKEDIN®, or the like), email applications, text messaging applications, calendar applications, and phone call placing and receiving applications. Hardware component that may disabled during the secured media session may include but are not limited to the SIM card, boot sequence, integrated built-in video camera, integrated built-in microphones, integrated built-in headphones, connected BLUETOOTH® devices such as EARPODS®, printers, headphones, touchscreen keyboard, volume operation button, stand-by operation button, home screen operation button, battery, or display configuration.

After the computing device components are disabled, that is either software applications, hardware applications, or both software and hardware applications are disabled, the method includes capturing media content, at the second mobile computing device using the integrated capture device, during the secure media session between the first and second mobile computing devices 404. As mentioned above, the image capture device may be a built-in digital camera configured and designed to capture photographs and record video and transmitting the captured photographs and video over a network. The lens may be a fixed-focus lens, a dual lens, triple lens configuration, or any configuration of lens known in the art and include a plurality of sensors, shutter, photoflash, BLUETOOTH®, geotag photo capability, and image stitching. The image capture devices may also include 4K resolution, high-definition resolution, HDR, optical zoom, optical image stabilization, three-dimensional imaging capability, bright lens, night mode, touchscreen execution, and bokeh-mode. The image capture device may be built into the first and/or second mobile computing device or the image capture device may be a separate image capture device connected to the first or second mobile computing devices through wired or wireless connectivity (e.g. BLUETOOTH® or USB or micro USB). The media content may be any activity, person, place, thing, event, environment, that may be captured using a camera or some other image capture device through photograph and/or video. In an alternate embodiment, the media content may also be audio related such as, voice, sounds, songs, concerts, or any other type of sound cable of being captured using audio equipment recording hardware (e.g. stand-alone or integrated microphones). By capturing the media content during the initiated secured media session, processing speed at the second mobile computing device is improved due to the server 102 being configured to receive the media content captured from the second mobile computing device. By disabling the computing device components (software applications and/or hardware components) the second mobile computing device cannot store any of the captured media content locally on their servicing device during the secure media session, thus increasing privacy of the captured media content, reducing memory usage at the second mobile computing device, and increasing CPU processing speed efficient during image upload/download. The method further captures media content, at the second mobile computing device using the integrated capture device, during the secure media session between the first and second mobile computing devices 404. While the second mobile computing device captures media content, typically on behalf of the requesting device (e.g. first mobile computing device), the hardware and software features, other than the integrated camera and microphone, of the second mobile computing device (servicing device) are completely disabled. In an alternate embodiment, the user of the requesting device (first mobile computing device) may permit the second mobile computing device to have access to various hardware components (such as text message or placing calls). During the secure media session, the second mobile computing device is fully engaged in capturing media content without access to the software and hardware applications stored on the second mobile computing device.

During the secure media session and as shown in FIG. 4, the method includes assigning, by the processor, an encrypted release ID to the first mobile computing device, wherein the encrypted release ID is associated with the secure ID 406. The third computing device, which may also be known as server 102, may include circuitry and program code designed to generate a release ID via the secure media module. The release ID will be assigned and transmitted to the first mobile computing device (requesting device) during the secure media session but immediately prior to deactivation of the secure media session. The third computing device will authenticate the secure ID and release ID via SSL or TLS encryption protocols. If the release ID matches the secure ID in which the captured media content is associated with, then the first mobile computing device may access the stored media content and be permitted to download, modify, or manipulate the media content. The media content may also then be uploaded to social media websites, email, text messages, or some other network modality. initiates the secure media session between the first and second mobile computing devices 212. Encryption program code (not shown) may also be configured to generate additional cryptographic keys or user profiles, which may be referred to as a secure ID and release ID, that may be used by the server 102 to initiate, assign, or release the secure media session via an encryption protocol designed to secure network communication using encryption in which two or more computing devices communicate over the network. In an alternate embodiment of the present disclosure, secure ID, which may be also referred to as a secure media session ID, may comprise of an alpha-numeric character string.

The method further includes deactivating, by the processor, the secure media session between the first and second mobile computing devices 408 and enabling the at least one media session between the first and second mobile computing devices 410. The secure media session may be deactivated automatically as designated by the user during application configuration of the secure media session application or it may be deactivating manually at the first mobile computing device and/or at the second mobile computing device. The third computing device may also deactivate the secure media session in the event of a network security breach, corrupted media content, corrupted digital image files, manually by the user of the third computing device, or automatically by the user of the third computing device. The third computing device may also be server 102 or any other computing device configured with the secure media module 114. Upon deactivation of the secure media session, the computing device components may be automatically, and instantly, enabled. In an alternate embodiment, software applications or hardware settings may be temporally stored in local memory at the disabled second mobile computing device prior to initiating a secure media session and later recalled immediately deactivation of the secure media session. In an alternate embodiment, as the second mobile computing device captures the media content using the integrated capture device, captured the media content, e.g. photographs, videos, or a combination thereof, are automatically transmitted and stored at the third computing device 102 prior to deactivating the secure media session.

Figure 5:
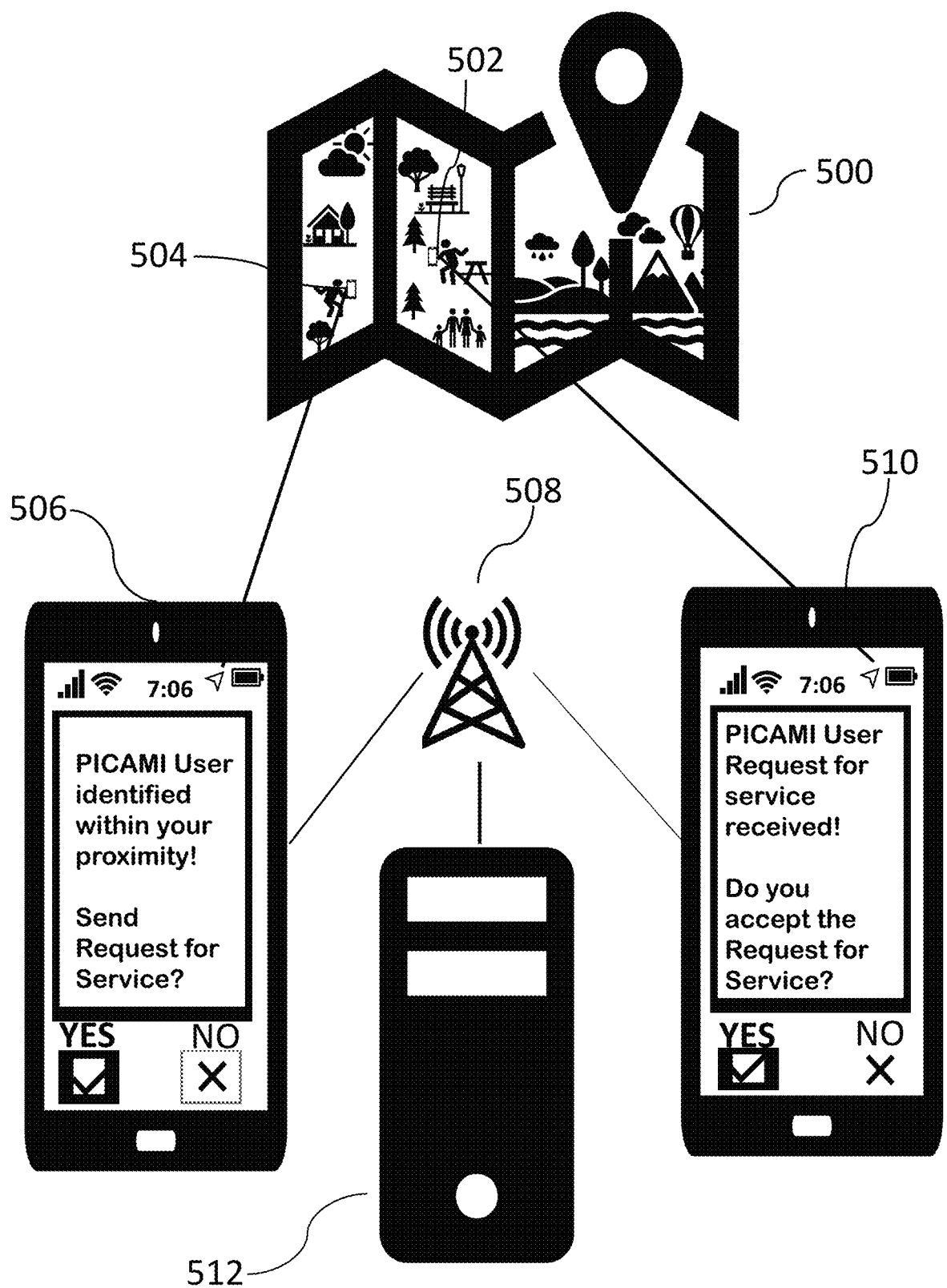
FIG. 5 is a block diagram illustrating the first and second mobile computing devices capturing geospatial location information in accordance with embodiments of the present disclosure.

FIG. 5 is a block diagram illustrating the first and second mobile computing devices capturing geospatial location information in accordance with embodiments of the present disclosure. As shown in FIG. 5, a geospatial map of an environment 500 is depicted where the user 506 of the first mobile computing device and the user 510 of the second mobile computing device are shown at two different geospatial locations. The server 512 determines the geospatial location information based on capturing the geospatial location information from the GPS receiver/module 504 (also referred to as GPS receiver 119) integrated within the first mobile computing device 504 and the GPS receiver/module 502 (also referred to as GPS receiver 119) at the second mobile computing device. The first mobile computing device 506 is located at predetermined proximity range, a proximity area, or a geospatial area that may be designated at a predetermined distance range of 0-10 feet, 10-20 feet, 20-50 feet, 150-500 feet, 500-1500 feet, 1500-3000 feet, or any reasonable distance or proximity measurement. According the FIG. 5, the predetermined proximity range of the first mobile computing device 506 is in front of a house. The second mobile computing device 510 is located at a predetermined distance range of 0-10 feet, 10-20 feet, 20-50 feet, 150-500 feet, 500-1500 feet, 1500-3000 feet, or any reasonable distance or proximity measurement. According the FIG. 5, the predetermined proximity range of the second mobile computing device 510 is at a park. The geospatial location information of the first mobile computing device 506 and second mobile computing device 510 is transmitted to the third computing device, also known as server 512, via network 508 (wireless, Wi-Fi, cellular network or the like).

Still referring to FIG. 5, the notification is displayed within the user interface 120 of the first mobile computing device 506, also referred to as the requesting device. The notification informs the user that the second mobile computing device, also known as the servicing device, is within the first mobile computing device's predetermined proximity range. The notification also specifies whether to send a request for service to the second mobile computing device identified within the proximity range of the first mobile computing device. The user of the first mobile computing device 506 is given an option as to whether to send the notification request. Upon selecting "yes", the second mobile computing device 510 receives a notification request to establish a secure media session, or in other words, accept a request for service. The service that may be performed by the second mobile computing device, includes capturing media content using the integrated camera of the second mobile computing device on behalf of the first mobile computing device during the secure media session between the first and second mobile computing devices. The communication between the first and second mobile computing devices may be established through the third computing device 512 via network 508. The proximity range may also be a geofence proximity in which the geofence is based on a distance proximity radius surround the first mobile computing device, e.g. requesting device 506. In an alternate embodiment, the second mobile computing device's distance is determined based on how far or close the second mobile computing device is from the first mobile computing device 506. The secure media session module of server 512 calculates whether the second mobile computing device is within the proximity range of the first mobile computing device by comparing the first captured geospatial location information metric 504 from the first mobile computing device 506 and the second captured geospatial location information metric 502 from the second mobile computing device 510. The proximity range may be set automatically by the server 512 based on user preferences established by the user during initial application configuration or may be changed manually by the user during operation of the secure media session application or secure media session module. The proximity radius, also known as the geospatial area or proximity range, may be set in any distance value, including but not limited to, inches, feet, meters, miles, or the like.

Figure 6:
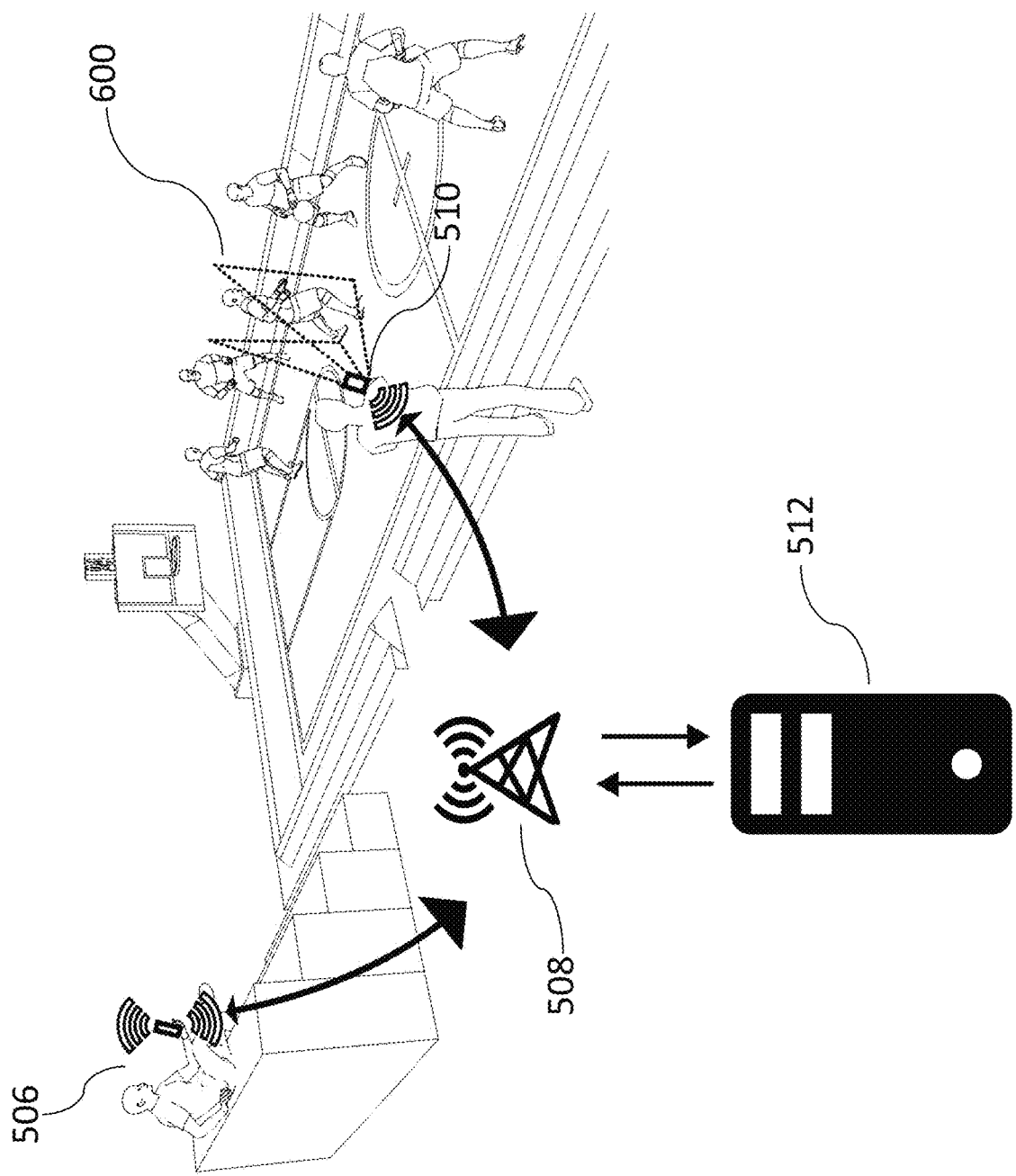
FIG. 6 is an illustration of an example environment in which the first and second mobile computing devices are connected in a secured media session while capturing the media content in accordance with embodiments of the present disclosure.

FIG. 6 is an illustration of an example environment in which the first and second mobile computing devices are connected in a secured media session while capturing the media content in accordance with embodiments of the present disclosure. In this example, the system is described as being used in the environment of a basketball court, but it should be understood that the system may also be used in the environment of park, concert, indoor event, or any other suitable environment that may be captured by a camera. As shown in FIG. 6, the first mobile computing device 506, also known as the requesting device 506, is being operated by a user who is enjoying a basketball game in which the user's son 600 is a participant. The second mobile computing device 510, also known as the servicing device 510, is capturing the basketball game utilizing the second mobile computing device's integrated camera at the request of the user. The basketball game corresponds to the aforementioned media content. Both the first mobile computing device 506 and the second mobile computing device 510 are connected in an initiated secure media session via network 508.

During the secure media session between the first and second mobile computing devices 506 and 510 and while the second mobile computing device 510 captures the basketball game, the software applications and hardware components of the second mobile computing device 510 are disabled. Meaning, the user of the second mobile computing device 510 will only be able to access the secure media application and associated integrated camera of the second mobile computing device 510. The user of the first mobile computing device's software applications and hardware components remains enabled. Based on the embodiments of the present disclosure, the user of the first mobile computing device 506 is able to enjoy the game without having to film his son 600 participate. Once the secure media session has ended, the captured content, whether that be photographs, video, or a combination of each, are encrypted and transmitted to the third computing device 512 via network 508. By capturing the media content during the initiated secured media session, processing speed at the second mobile computing device during operation is improved due to the server 512 being configured to receive the media content captured from the second mobile computing device. By disabling the computing device components (software applications and/or hardware components) the second mobile computing device cannot store any of the captured media content locally in memory of the servicing device 510 during the secure media session, thus enhancing data privacy at the first mobile computing device 506, e.g. requesting device 506, reducing memory usage at the second mobile computing device 510, and increasing CPU processing speed efficient during image upload/download at both the first and second mobile computing device.

Figure 7:
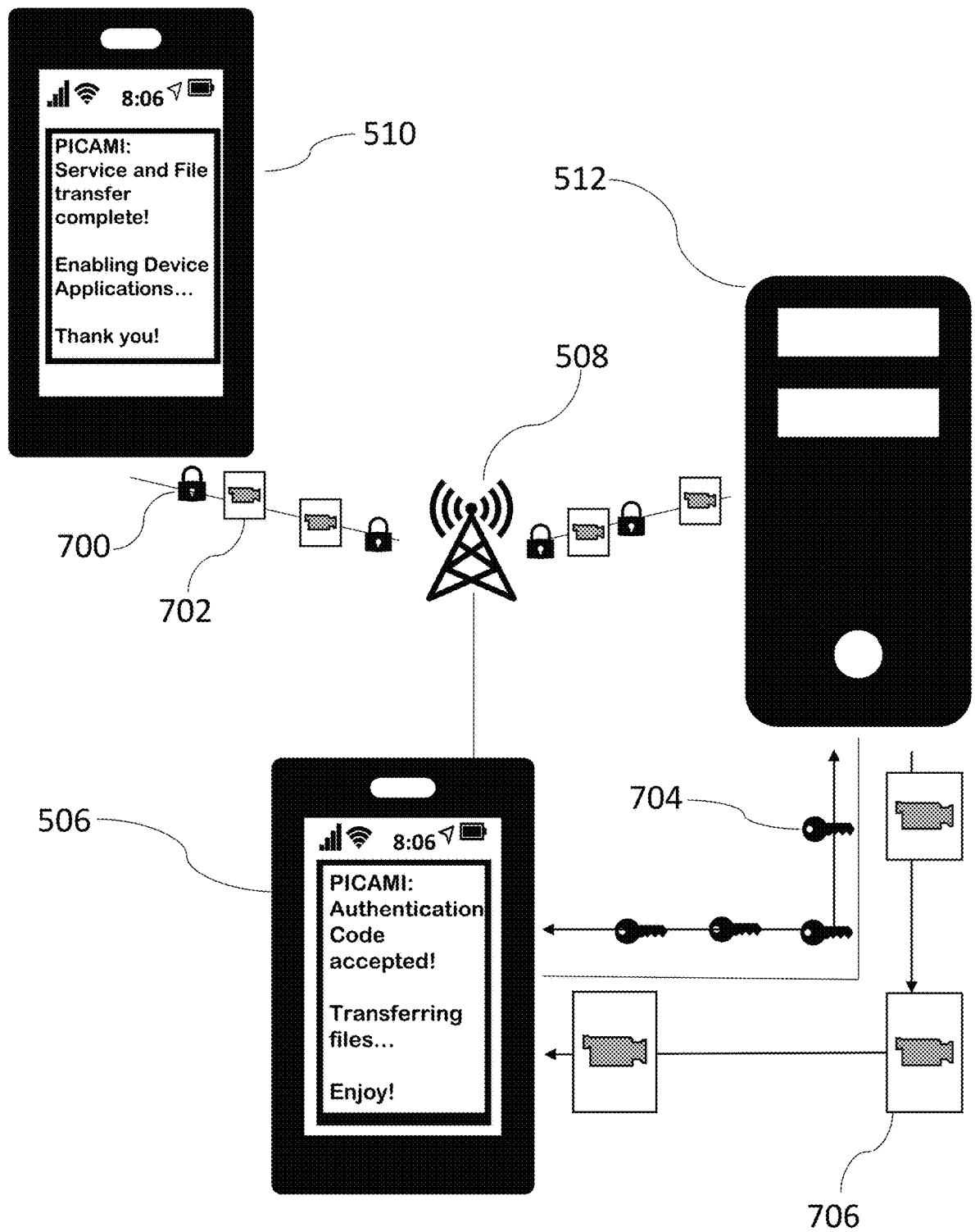
FIG. 7 is a block diagram depicting the first and second mobile computing devices securely transmitting and receiving the media content in accordance with embodiments of the present disclosure.

Now turning to FIG. 7 which discloses a block diagram depicting the first and second mobile computing devices securely transmitting and receiving the media content in accordance with embodiments of the present disclosure. As shown in FIG. 7, third computing device 512 (server 102) receives the captured media content 702, e.g. photographs and video 702, from the second mobile computing device 510. The captured photographs and video 702 are transmitted to the server 512 compiled and encrypted via the secure ID 700. As mentioned above, the secure ID 700 associated with the captured photographs and video 702 may be encrypted using encryption algorithms and transmitted via an encryption file transfer protocols, such as SSL (Secure Sockets Layer), FTP (File Transfer Protocol), FTPS (File Transfer Protocol Secure), SFTP (SSH File Transfer Protocol), HTTPS (Hyper-Text Transfer Protocol Secure), that are designed to secure network communication between two or more computing devices as they transmit and/or communicate over the network. Once the photographs and video 702 are received and stored at the server 512, the first mobile computing device 506, also known as the requesting device, connects via network 508, to the server 512 in order to download the captured photographs and video 702. The first mobile computing device transmits the release ID 704 to the server 512, e.g. third computing device. The server 512 generates a digital image file 706 which may contain the captured photographs, video, audio files, or any other form of captured media content. The digital image file 706 containing the captured media content may be in any format, such as TIFF, JPEG, GIF, PNG, or RAW image files.

The third computing device, e.g. server 512 may verify whether the release ID 704, as provided to the system by the first mobile computing device in order to access and download the digital image file, corresponds to the secure ID 700. The digital image file containing the captured media content may be encrypted using encryption algorithms and transmitted via an encryption file transfer protocols, such as SSL (Secure Sockets Layer), FTP (File Transfer Protocol), FTPS (File Transfer Protocol Secure), SFTP (SSH File Transfer Protocol), HTTPS (Hyper-Text Transfer Protocol Secure), that are designed to secure network communication between two or more computing devices as they transmit and/or communicate over the network. The digital image file may only be unlocked after verification of a generated private and/or public keys using encryption algorithms. The generated private and/or public key may be known as a release ID and secure ID. In an alternate embodiment, upon downloading the digital image file 706, a request to purchase the digital file may be displayed before the first mobile computing device prior to download. Further, a currency allocation (payment) may be applied to an account associated with the profile of the second mobile computing device 510 in consideration for executing the captured image transfer to the third computing device. The secure media module 114 at the third computing device 512 may transmit a payment transaction to the first and/or second mobile computing device. The payment transaction may include a payment allocated to the user profile account or a request for payment from the user profile account. The first and/or second mobile computing device may further transmit the payment transaction back to the third computing device 512. The payment transaction may be implemented upon verifying that the secure ID and release ID match or correspond to each other and may be further executed at the first and/or second mobile computing device.

The present subject matter may be a system, a method, and/or a computer program product. The computer program product may include a computer readable storage medium (or media) having computer readable program instructions thereon for causing a processor to carry out aspects of the present subject matter.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present subject matter may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present subject matter.

Aspects of the present subject matter are described herein with reference to flowchart illustrations and/or block diagrams of methods, apparatus (systems), and computer program products according to embodiments of the subject matter. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present subject matter. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the embodiments have been described in connection with the various embodiments of the various figures, it is to be understood that other similar embodiments may be used or modifications and additions may be made to the described embodiment for performing the same function without deviating therefrom. Therefore, the disclosed embodiments should not be limited to any single embodiment, but rather should be construed in breadth and scope in accordance with the appended claims.

What is claimed:

1. A method comprising:
    receiving, from a first mobile computing device associated with a user, a request to initiate a secure media session;
    determining, by, a first geospatial location of the first mobile computing device;
    determining, by, a second geospatial location of a second mobile computing device;
    determining, that the second mobile computing device is within a proximity of the first mobile computing device;
    in response to determining that the second mobile computing device is within the proximity of the first mobile computing device, transmitting, a notification to initiate the secure media session between the first mobile computing device and the second mobile computing device;
    initiating, the secure media session between the first and second mobile computing device;
    responsive to initiating the secure media session, disabling at least one device component at the first mobile computing device, disabling at least one device component at the second mobile computing device, and disabling at least one application at the second mobile computing device and the first mobile computing device;
    at the second mobile computing device:
    capturing, using an image capture device, media content during the initiated secure media session between the first and second mobile computing device;
    associating a secure media session ID with the captured media content;
    as directed by server, transmitting the captured media content and associated secured media session ID to a first memory location at a third computing device during the secured media session;
    and
    deactivating, the secure media session between the first and second mobile computing device.

2. The method of claim 1, wherein the first and second mobile computing device comprises any one of a network server, smartphone, device terminal, point-of-sale terminal, laptop computer, global position system, and desktop computer.

3. The method of claim 1, wherein the proximity comprises any one of a distance range of 0-10 feet, 10-20 feet, 20-50 feet, 50-150 feet, 150-500 feet, 500-1500 feet, and 1500-3000 feet.

4. The method of claim 1, wherein the first geospatial location information and second geospatial location information comprises any one of geo-spatial coordinates, map coordinates, longitude, latitude, speed, time, global positioning system coordinates, waypoints, points-of-interest, and regions-of-interest.

5. The method of claim 1, wherein the proximity comprises a geospatial area ranging between 1 foot to 5 miles within a geospatial distance of the first mobile computing device.

6. The method of claim 1, wherein the request comprises a user profile of a user of the first mobile computing device and device information of the first mobile computing device and the notification comprises a user profile of user of the second mobile computing device and device information of the second mobile computing device.

7. The method of claim 6, wherein the device information comprises any one of memory capacity, carrier information, model number, serial number, wi-fi address, Bluetooth capability, IMEI, ICCID, Firmware type, and device type information associated with the second mobile computing device.

8. The method of claim 1, wherein the secure media session comprises a secure network communication link between the first and second mobile computing devices enabling data transfer between the first and second mobile computing devices in real-time.

9. The method of claim 1, wherein the secure media session ID comprises an alpha-numeric character string.

10. The method of claim 1, wherein in response to deactivating the secure media session, assigning a release ID to the first mobile computing device, wherein the release ID is associated with the secure media session ID; and
transmitting a payment transaction to the third computing device.

11. The method of claim 10, further comprising:
in response to assigning the release ID, determining that the secure media session ID matches the release ID; and
in response to determining that the secure media session ID matches the release ID, accessing, at the location in memory of the third computing device, the captured media content associated with the secure media session ID.

12. The method of claim 1, wherein the media content comprises any one of a picture, video, movie, emoji, augmented reality image, music, and digital image.

13. The method of claim 1, further comprising:
disabling at least one software application and at least one hardware component integrated at the first and second mobile computing devices when the secure session has been initiated.

14. The method of claim 1, further comprising:
executing a payment transaction at the first mobile computing device; and
transmitting, by a processor, the executed payment transaction to the second mobile computing device.

15. The method of claim 1 further comprising:
at the first mobile computing device, accessing the captured media content stored at the first memory location of the first mobile computing device via a release ID.

16. The method of claim 1, wherein determining, by the processor, that the second mobile computing device is within the proximity of the first mobile computing device is based on comparing the first geospatial location and the second geospatial location of the first and second mobile computing devices.

17. A system comprising:
a processor; and
a memory device storing computer-readable instructions, which when executed by the processor, cause the processor to:
receive, from a first mobile computing device associated with a user, a first request to initiate a secure media session;
determine a first geospatial location of the first mobile computing device;
determine a second geospatial location of a second mobile computing device;
determine that the second mobile computing device is within a proximity of the first mobile computing device based on comparing the first and second geospatial location of the first and second mobile computing devices;
in response to determining that the second geospatial location of the second mobile computing device is within the proximity of the first mobile computing device, transmit a notification to initiate the secure media session with the first mobile computing device;
initiate the secure media session between the first and second mobile computing devices;
disabled at least one device component at the first mobile computing device during the secure media session;
disable at least one device component at the second mobile computing device during the secure media session;
disable at least one application at the second mobile computing device and the first computing device during the secure media session;
capture, at the second mobile computing device using an image capture device, media content during the secure media session between the first and second mobile computing devices;
transmit the captured media content to a memory location of a third computing device during the secured media session; and
deactivate the secure media session.

18. The system of claim 17, wherein the computer-readable instructions, when executed by the processor, cause the processor to access the captured media content stored at the first memory location of the first mobile computing device via a release ID.

19. The system of claim 18, wherein the computer-readable instructions, when executed by the processor, cause the processor to:
assign a secure media session ID to the second mobile computing device, wherein the secure media session ID is associated with the stored captured media content of the second mobile computing device upon transmitting the media content to the memory location at the third computing device;
assign a release ID to the first mobile computing device, wherein the release ID is associated with the stored captured media content at the third computing device;
determine whether the secure media session ID matches the release ID; and
in response to determining that the secure media session ID matches the release ID, access the stored media content associated with the secure media session ID.

20. The system of claim 17, wherein the secure media session comprises a secure network communication link between the first and second mobile computing devices enabling data transfer between the first and second mobile computing devices in real-time.

* * * * *